United States Patent [19]

Liechti et al.

[11] Patent Number: 5,038,153

[45] Date of Patent: Aug. 6, 1991

[54] FRANKING MACHINE

[75] Inventors: Hans-Peter Liechti, Zollikofen; Matthias Jungck; Luigi Baldisserotto, both of Bern, all of Switzerland

[73] Assignee: Ascom Hasler AG., Bern, Switzerland

[21] Appl. No.: 375,945

[22] Filed: Jul. 6, 1989

[30] Foreign Application Priority Data

Jul. 14, 1988 [CH] Switzerland .......................... 2709/88

[51] Int. Cl.[5] .......................................... G01D 15/18

[52] U.S. Cl. .................................. 346/140 R; 346/75

[58] Field of Search ............................ 346/75, 140 R

[56] References Cited

U.S. PATENT DOCUMENTS

| | | | |
|---|---|---|---|
| 4,194,210 | 3/1980 | Krause | 346/75 |
| 4,283,731 | 8/1981 | Bok et al. | 346/75 |
| 4,393,386 | 2/1983 | Di Givlio | 346/75 |
| 4,510,509 | 4/1985 | Horine et al. | 346/140 R |
| 4,528,575 | 7/1985 | Matsuda et al. | 346/140 R |
| 4,544,930 | 10/1985 | Paranjpe | 346/75 |
| 4,809,016 | 2/1989 | Padalino | 346/75 |

FOREIGN PATENT DOCUMENTS

| | | |
|---|---|---|
| 3208104 | 9/1983 | Fed. Rep. of Germany . |
| 8801818 | 3/1988 | World Int. Prop. O. . |

*Primary Examiner*—Benjamin R. Fuller
*Assistant Examiner*—Gerald E. Preston
*Attorney, Agent, or Firm*—Brady, O'Boyle & Gates

[57] ABSTRACT

Franking machine with an inkjet printer wherein the inkjet nozzles are offset in the travel direction (7) of the piece of mail (3) as well as transversely thereto. Due to the offsetting, the ink drop dots can be applied to a piece of mail (3) in partially overlapping fashion and adjoining one another without gaps. In a preferred embodiment, the inkjet nozzles (5) are arranged in equidistant columns ( . . . 1 to . . . 4) perpendicular to the travel direction (7) and in likewise equidistant rows oblique to the travel direction.

12 Claims, 2 Drawing Sheets

FRANKING MACHINE

The invention relates to a franking machine.

A franking machine of this type has been disclosed in DE-A-2,501,035. The conventional franking machine has drive rolls for transporting the mail, a drum carrying a cliché that has a print format remaining identical with each franking, and an inkjet printer arranged in the interior of the drum spraying, through apertures in the cliché, the changing print characters (date, postage rate) onto the mail material. The individual nozzles of the inkjet printer are arranged in a line perpendicular with respect to the travel direction of the mail.

The inkjet printer does have the advantage of high flexibility when applying variable characters, it is true, but the imprint produced thereby is, as can be seen from the drawing of the DE-A, unsightly, difficult to recognize and read, and therefore unsuitable in particular, for advertising purposes. For this reason, the machine according to the DE-A uses the inkjet printer only for the data that vary daily and/or with each franking whereas all other data and picture elements are printed with the use of the cliché. In case another print format (for example, a new advertising slogan, another company logo, information regarding new company products different depending on the addressee) is to be utilized, or in case a damaged printing block must be replaced, then every time the printing block must be dismounted. This disassembly is time-consuming and, on account of the ink on the cliché, is dirty work shunned by the personnel.

A franking machine of another type has been described in DE-A-2,701,072. This machine involves a miniature franker with microcomputer without a conveying means which is pushed manually across the mail to be franked. The entire imprint is performed by an inkjet printer. The imprint, as can be seen from the drawing of DE-A-2,701,072, is just as poorly recognizable and readable as that of the inkjet printer according to DE-A-2,501,035.

It is an object of the invention to provide a franking machine of the type mentioned hereinabove applying all of the image and character elements with the aid of an inkjet printer to the mail and, respectively, label in order to permit quick changes of any desired image and character elements, and yet producing an esthetically pleasing, readily recognizable and readable imprint.

The invention provides a solution of these two component problems, considered to be irreconcilable in the prior art.

The advantage attained by the invention is to be seen essentially in that it is possible to obtain by inkjet printer a complete surface coverage and differing color intensity of the image and character elements on the piece of mail and/or on the label. Thus, a rapid change of the imprint is achieved along with an imprint that is esthetically pleasing by solid lines and fully covered areas and is readily recognizable and readable.

The arrangement of the inkjet nozzles, offset transversely and longitudinally to the travel direction, can be such that the inkjet nozzles are disposed in at least one row extending obliquely to the travel direction, or in several columns extending perpendicularly to the travel direction, the nozzles of each column being offset with respect to each other perpendicularly to the travel direction with regard to the nozzles of the neighboring column and/or columns. Consequently, the spacing of the picture dots perpendicularly to the travel direction can be reduced so that the dots adjoin one another without gaps or overlap one another. The spacing of the picture dots could, it is true, also be decreased in case of inkjet nozzles arranged side-by-side in a row perpendicularly to the travel direction of the mail material, by placing these nozzles at a relatively great distance from the mail and inclining the axes or outlet directions of the outer nozzles toward the middle of the row. However, in such an arrangement inclined with respect to the vertical the height of the type face would change with the spacing of the piece of mail from the nozzle orifice. Since the surface of the mail to be imprinted is not exactly planar, a wavy type face would be produced.

Preferably, the inkjet nozzles are arranged in several mutually parallel rows and columns in such a way that the columns lie approximately perpendicularly to the travel direction of the mail, and the rows form an acute angle with the travel direction. Thus, it is possible to produce ink drop dots adjoining one another without gaps along a straight line extending perpendicularly to the travel direction without an unsightly staggered line being formed. The preferred nozzle arrangement makes it possible to produce, besides the straight lines without staggering extending perpendicularly to the travel direction, also straight lines without staggering extending at a great variety of angles obliquely to the travel direction.

Preferably, the inkjet nozzle rows and columns are equidistant, the inkjet nozzles of neighboring columns being offset approximately by the distance of two neighboring inkjet nozzles of one column divided by the number of columns or by an integral divisor of the number of columns. If the distance is divided by an integral divisor, then, depending on the divisor employed, several nozzles can spray along one and the same line. The printed image thus is imbued with a more intense color impression and, respectively, it is possible in this way to generate lines which stand out against the remaining picture.

One portion of the inkjet nozzles can be associated with one color, and the other portion with at least one other color. For example, the nozzles located in adjacent columns can each spray a different color ink. Thereby, multicolored imprints can be produced making it impossible to create a counterfeit of the imprint by, for example, making copies with the use of copiers. With the above-mentioned arrangement of the nozzles in columns and rows, polychrome prints can be produced with superimposed chromatic components.

The spacing of the ink drop dots in parallel to the travel direction depends on the chronological spacing of the activating pulses applied to the inkjet nozzles and on the conveying speed of the mail. In order to obtain a flawless imprint, the speed of the pieces of mail is therefore suitably measured by means of a velocity pickup. The pickup transmits a signal proportional to the velocity to a clock generator of the control device controlling the respective inkjet nozzles. The pickup can be either a mechanical, magnetic or optical velocity pickup.

The inkjet nozzles are advantageously arranged to be stationary, and the pieces of mail are moved by means of the conveying device past the inkjet nozzles preferably in prone or in upright position. In this process, the mail can be placed, for example, into a loading station and fed to the conveying device by means of a segregator mechanism.

In order to increase color intensity, several ink drops can be sprayed approximately onto one and the same location of the piece of mail. This can be done either by means of inkjet nozzles each having several outlet orifices, or by means of repeated activations of the same nozzle taking place in immediate succession.

The invention will be described in greater detail below with reference to the appended drawing showing only one realization wherein.

The franking machine comprises a conveying device which moves the piece of mail 3 to be franked past a stationary inkjet printer and a franking unit with a control device 6 for the control of the inkjet printer, as well as a postage accounting device wherein the sum total of the frankings imprinted by the franking unit is formed and stored for the purpose of subsequent accounting to the Post Office, or wherein the value of the imprinted frankings is deducted from an already prepaid amount. The postage accounting device is protected against manipulating by the user; accounting functions can be performed only by authorized persons of the Post Office by means of adequate identifications. The conveying means and the postage accounting device are designed as customary in the state of the art and therefore have not been illustrated.

Figure 1:
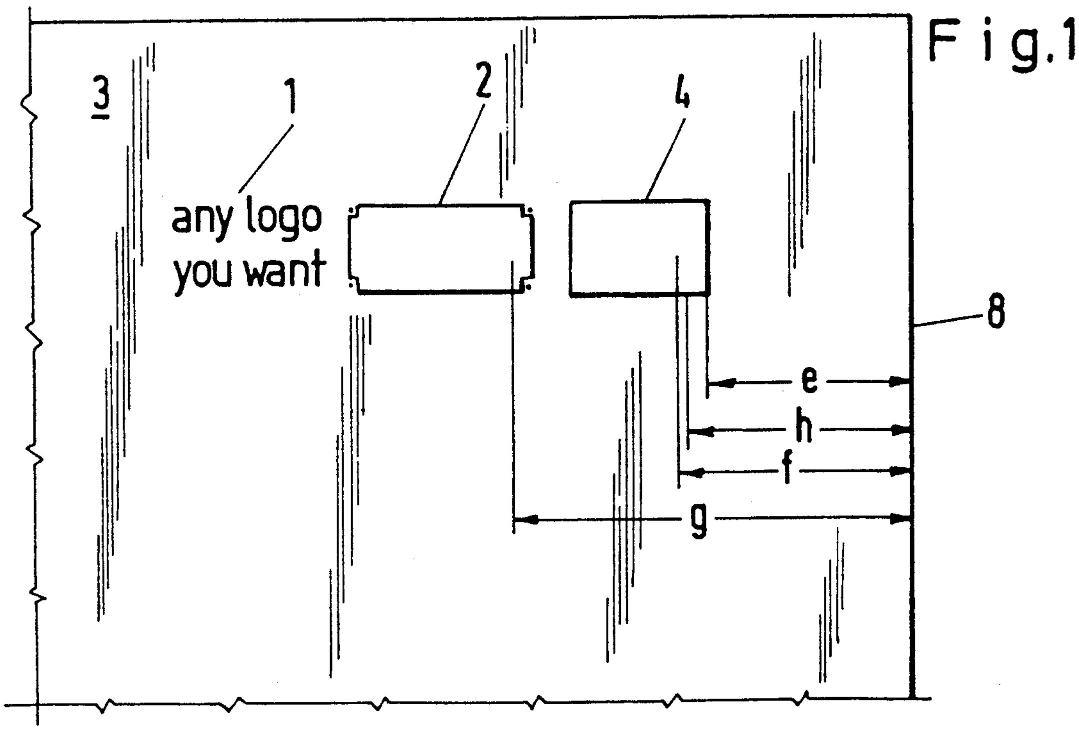
FIG. 1 shows an example of an imprint.

The piece of mail 3 is moved past the inkjet printer by the conveying means. As shown in FIG. 1, an imprint is made of a logo 1 as the company advertisement, a date stamp 2, and a franking stamp 4, as well as optionally further information, such as type of shipping, mail categories, postal meter identification, etc.

Figure 2:
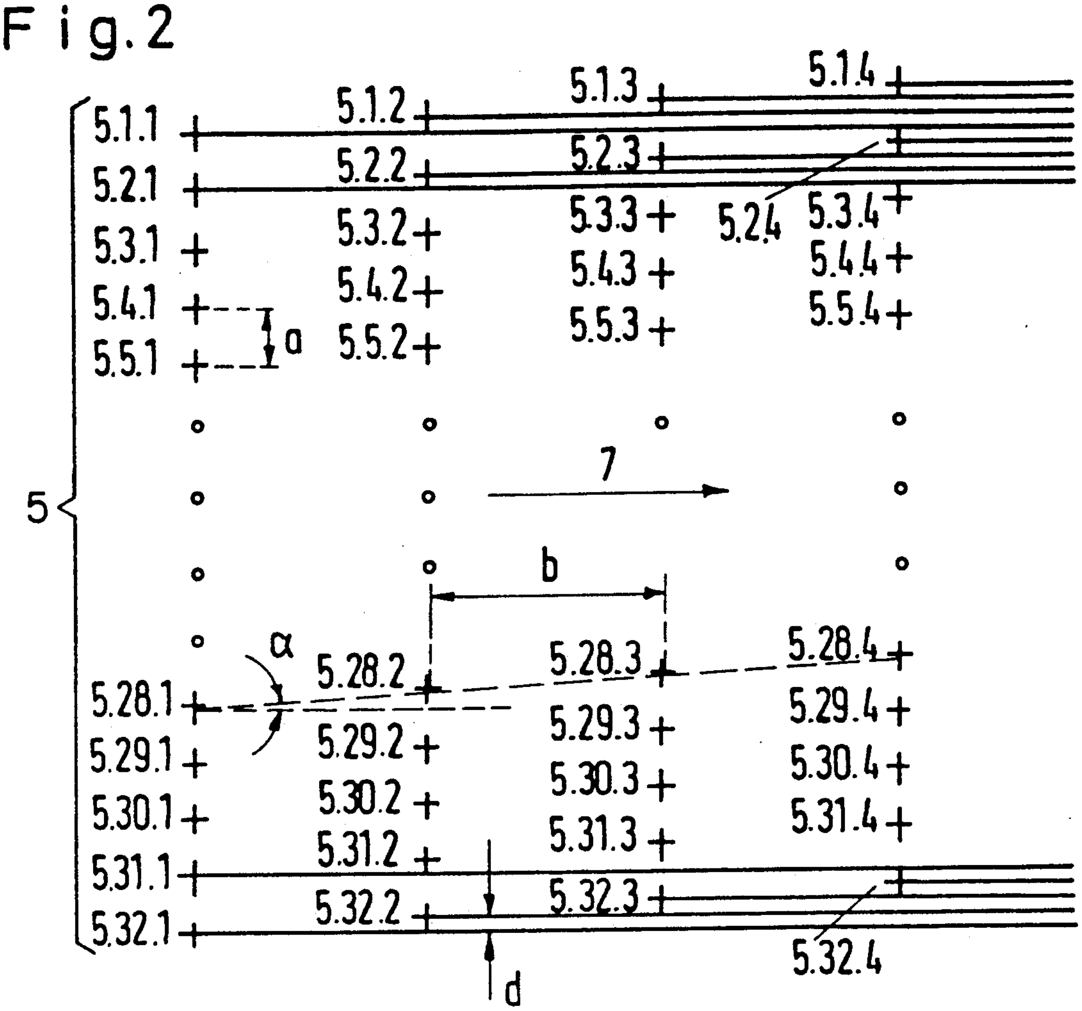
FIG. 2 shows a schematic view of an arrangement of inkjet nozzles in accordance with this invention.
Figure 3:
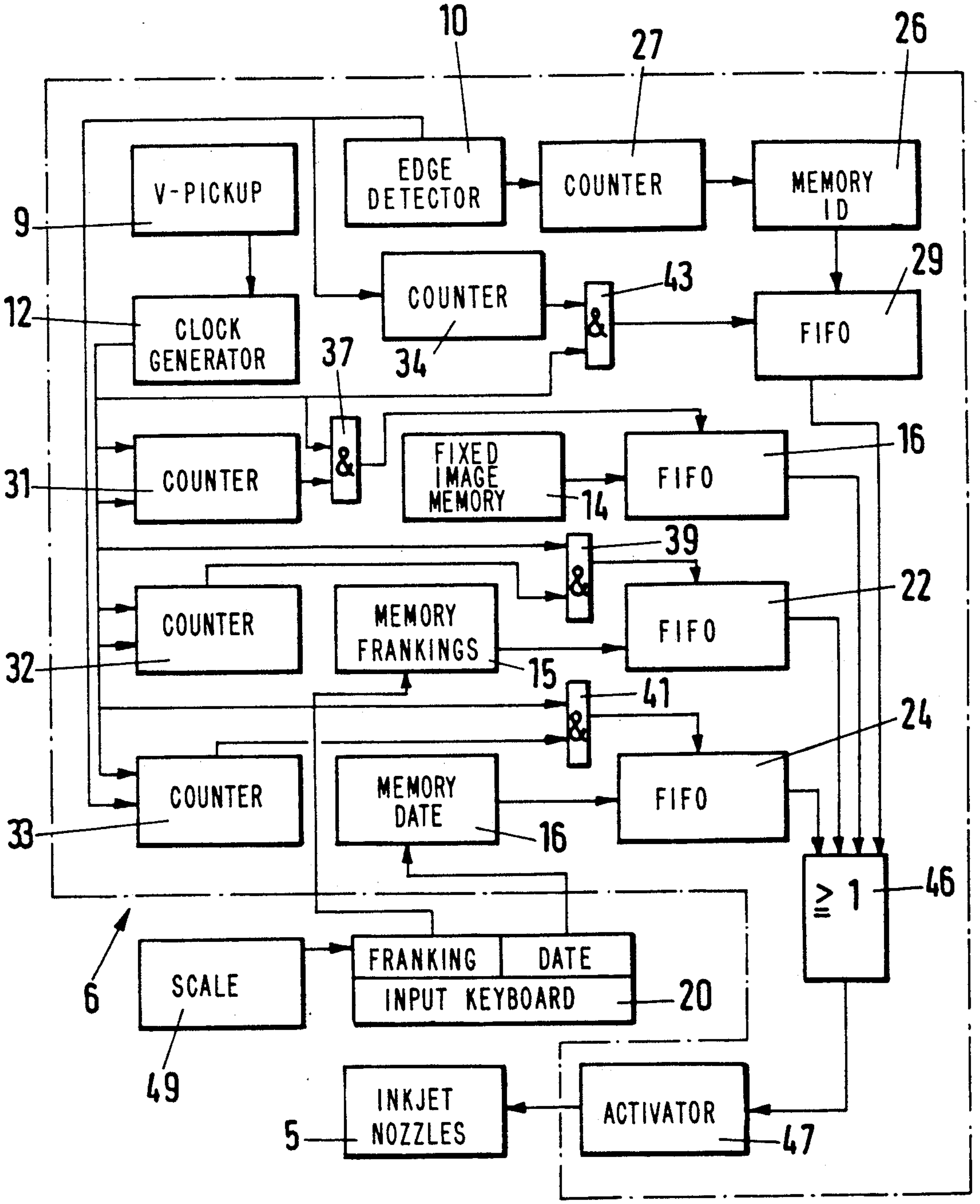
FIG. 3 is a block diagram of a control device for controlling the ink drop ejection of the nozzles of FIG. 2, with input keyboard and scale.

As shown schematically in FIG. 2, the inkjet printer has several inkjet nozzles 5 (indicated by crosses) arranged offset transversely and longitudinally to the travel direction 7 of the piece of mail 3. The ink ejection is controlled by the control device 6, the schematic block diagram of which is illustrated in FIG. 3. As will be described in greater detail below, the nozzles are arranged and are activated in such a way that ink drop dots can be applied to the piece of mail 3 which are approximately continuously adjacent one another or which at least partially overlap one another.

The inkjet nozzles 5 are arranged in the illustrated and described example in FIG. 2 in thirty-two mutually parallel rows 5.1.1–5.1.4, . . . , 5.32.1–5.32.4, and four columns 5.1.1–5.32.1, . . . , 5.1.4–5.32.4, wherein the columns 5.1.1–5.32.1, . . . , 5.1.4–5.32.4 lie perpendicularly to the travel direction 7, and the rows 5.1.1–5.1.4, . . . , 5.32.1–5.32.4 form an acute angle $\alpha$ of, for example, approximately 8°, with the travel direction 7. In FIG. 2, the piece of mail 3 is located beneath the inkjet nozzles 5 illustrated as crosses. The row of the inkjet nozzles lying farthest to the left in the direction of travel 7 is denoted by 5.1.1–5.1.4, and the one lying farthest to the right by 5.32.1–5.32.4. On account of the oblique positioning of the nozzle rows with respect to the travel direction 7, the mutual spacing of the nozzles 5 perpendicularly to the travel direction 7 is equal to the actual spacing b multiplied by the tangent of the angle $\alpha$. The nozzles 5 of each column are thus mutually offset with reference to the nozzles of the neighboring column or columns 5.1.1–5.32.1, . . . , 5.1.4–5.32.4 transversely to the travel direction 7 by a spacing d.

The spacing a of the rows 5.1.1–5.1.4, . . . , 5.32.1–5.32.4 perpendicularly to the travel direction 7 is, in the chosen embodiment, for example 0.8 mm, and the spacing b of the columns 5.1.1–5.32.1, . . . , 5.1.4–5.32.4 is, for example, 6 mm. The displacement d of the individual inkjet nozzles 5 of one column with respect to the preceding and subsequent columns is equal to the spacing a of an inkjet nozzle in one column to the neighboring one, divided by the number of columns, in the present case being four:

$$d = \frac{a}{\text{Number of Columns}} = b * \tan\alpha.$$

This arrangement makes it possible, even with relatively remotely spaced inkjet nozzles 5, to obtain good surface coverage by closely juxtaposed ink drop dots on the surface of the piece of mail.

The mode of operation of the franking machine will be described below with reference to the block diagram in FIG. 3.

The piece of mail 3 is transported by means of the conveyor, not shown, to the inkjet printer. As soon as the leading edge 8 of the piece of mail 3 passes beneath an edge detector 10, preferably an electrooptic light barrier, an electric signal from the edge detector 10 actuates a velocity pickup 9 which measures the speed of the piece of mail 3 optically or mechanically. The electric output signal of the velocity pickup 9 controls a clock generator 12 which can be designed, for example, as a VCO. The clock generator 12 generates electrical pulses, the frequency of which is proportional to the velocity. The imprint on the piece of mail 3, as shown in FIG. 1, takes place from the right toward the left, first with the postage rate stamp 4, then the date stamp 2, and finally the company logo 1.

The image information of the postage rate stamp 4 without numerical value, of the date stamp 2 without the date, and of the logo 1 are stored in a memory 14 for a so-called fixed image. From this memory 14, the picture information is read into a further memory, designed, for example, as a FIFO 16, in correspondence with the four columns of respectively thirty-two inkjet nozzles; this information can be read out again therefrom at the timing of the clock generator 12. The picture information is read in so that the picture portions lying, in FIG. 1, closest to the edge 8 of the piece of mail for the first column 5.1.1–5.32.1 are read in first. Next follows the picture information for the second column 5.1.2–5.32.2, together with the information for the first column 5.1.1–5.32.1, and so forth. Since the rows 5.1.1–5.32.1, . . . , 5.1.4–5.32.4 extend in the travel direction 7 obliquely toward the left, and the inkjet nozzles 5 of one column are offset with respect to those of the neighboring columns, the picture information is stored in mirror-image mode and in nested form.

The information for printing, for example, a linear mark perpendicular to the travel direction 7 across the entire width of the imprint is stored, as described further below, in the FIFO 16 and transmitted, after applying the respective read-out pulses, via an OR gate 46 to an activator 47 which simultaneously actuates all inkjet nozzles 5.1.1 to 5.32.1 of column . . . 1 by electrical pulses. After a time $t_1$ during which the piece of mail 3 has been moved by the distance b, all inkjet nozzles 5.1.2 to 5.32.2 of column . . . 2 receive an electrical pulse, after an additional time $t_1$ the inkjet nozzles 5.1.3 to 5.32.3 of column . . . 3, and after a further time $t_1$ the inkjet nozzles 5.1.4 to 5.32.4 of column . . . 4 receive an electrical pulse. The perpendicular linear mark is finished.

The information for printing, for example, a linear mark parallel in the travel direction 7 approximately in the center of the imprint is likewise stored in the FIFO 16, and by means of the activator 47, the nozzle 5.16.4 is fed with a pulse train. If the spacing of the ink drop dots in the travel direction 7 is equal to the distance d of the ink drop dots perpendicular to the travel direction 7, then the following results for a chronological pulse interval $t_2$ since the velocity v of the piece of mail 3 is $v=b/t_1$ $$t_2 = \frac{d}{v} = \frac{d^*t_1}{b}$$

If the time of the pulse intervals $t_2$ is shortened, the ink drop dots approach each other more closely in the travel direction 7; they overlap, in part, and the thus-produced picture has imparted to it a more vigorous color intensity, solid lines, and fully opaque areas.

As the next example, printing of a "1" will be described wherein the vertical stroke has a length of 24 mm and the oblique stroke at 45° has a "height" of 10 mm. The "1" is to be located at the uppermost rim of the printed area producible by the inkjet nozzles 5. The following numerical sequence is to be read in the direction of the arrows and indicates the nozzle or nozzles subjected to simultaneous activation after which period of time, the time periods being set forth in parentheses, reference being had to the above-determined time $t_2$ as a basis. The printing step begins at the instant of actuation of the nozzles 5.1.1 to 5.30.1 of the first column . . . 1 when the location of the traveling piece of mail 3 where the vertical stroke of the "1" is to be printed lies beneath the nozzles of column . . . 1. After a time ($3^*t_2$), the nozzle 5.1.1 of the first column . . . 1 writes the first dot along the oblique line of the "1", then follow after a time ($4^*t_2$)→5.2.1→($4^*t_2$)→5.3.1→($4^*t_2$)→5.4.1→
($4^*t_2$)→5.5.1→($4^*t_2$)→5.6.1→($4^*t_2$)→5.7.1 until, after a time ($3^*t_2$) the nozzles 5.1.2 to 5.30.2 of the second column . . . 2 again write dots of the vertical stroke. After the time intervals mentioned below, nozzles of the first . . . 1 and of the second . . . 2 column write further dots of the oblique line ($2^*t_2$)→5.8.1→($1^*t_2$)→5.1.2→($3^*t_2$)→5.9.1→
($1^*t_2$)→5.2.2→($3^*t_2$)→5.10.1→($1^*t_2$)→5.3.2→
($3^*t_2$)→5.11.1($1^*t_2$)→5.4.2→ and after the time period ($3^*t_2$) the nozzle 5.12.1 is activated, as the last nozzle of column . . . 1, to write the "1", and after a time ($1^*t_2$) the subsequent nozzles of the second column . . . 2 write on the oblique line:

5.5.2→($4^*t_2$)→5.6.2→($4^*t_2$)5.7.2→.

After a time ($4^*t_2$) the nozzles 5.1.3 to 5.30.3 of the third column . . . 3 write dots of the vertical stroke and, simultaneously, the nozzle 5.8.2 of the second column . . . 2 writes a dot on the oblique line. After a time ($1^*t_2$), dots of the oblique line are written by the second and third columns 5.1.3→($3^*t_2$)→5.9.2→ and so forth.

Analogously, the same procedure is applied regarding the varying picture data for the postage rate and the date which are stored in a memory 15 for postage rates and in a memory 17 for the date. The data contents for the postage rates in memory 15 and for the date in memory 16 are preselected by an input keyboard in an input unit 20 and are read into a FIFO 22 and, respectively, 24 in a process not described herein.

For flawless identification and for examining the genuineness of the franking, a character consisting of a letter combination and/or character combination is, for example, included in the print, this character being changed with each franking, for example in accordance with a fixed code. The picture information of these numerical characters is stored in a memory 26 analogously to the above-described way. The memory 26 determines its numerical information from the reading of a counter 27 which latter is increased by one by the edge detector 10 with each passage of a piece of mail 3. This numerical information is transferred into a FIFO 29.

The pulses produced by the clock generator 12 are synchronized, as described above, with the speed of the piece of mail 3 by the velocity pickup 9. The control device includes four counters 31, 32, 33 and 34. All four counters 31, 32, 33 and 34 are started by the pulse of the edge detector 10 and count the pulses of the clock generator 12 up to a predetermined number that can be set at the respective counter 31, 32, 33 and, respectively, 34. The counters 31, 32, 33 and 34 are reset by an electrical signal produced by the edge detector 10 when the piece of mail 3 leaves the inkjet printer.

The predetermined number of counter 31 is a measure for the distance e of the right-hand beginning of the imprint on the piece of mail 3, in FIG. 1 being the right-hand vertical stroke of the franking stamp 4. The predetermined number of the counter 32 is a measure for the distance f of the right-hand beginning of the franking print; in the franking stamp 4 this is the right-hand "0". It is to be noted that the imprint begins in mirror-image mode and nested against the reading direction from the right toward the left. The predetermined number of counter 33 is a measure for the distance g of the right-hand beginning of the date; in the date stamp 2 this is the right-hand rim of the "8". Printing here also takes place in mirror-image mode and nested. The predetermined number of counter 34 is, in analogy to the above remarks, a measure for the distance h of the right-hand beginning of the numbering which, in the example, is located in the franking stamp 4 but which can also be located at some other site.

The printing information is in each case read into the corresponding FIFO's 16, 22, 24 and 29. However, this information cannot as yet be read out since the clock pulses necessary for readout are in each case blocked by an AND gate 37, 39, 41 and 43, respectively. Each AND gate 37, 39, 41 and 43 has two inputs and one output. Respectively one input of the AND gates 37, 39, 41 and 43 is connected to the output of the clock generator 12, the other input being connected to the output of the counter 31, 32, 33 and 34, respectively, while each output is connected to the clock input of the respective FIFO 16, 22, 24 and 29. Only once the respective counter 31, 32, 33 and 34 has surpassed the preset value will the respective AND gate 37, 39, 41 and 43 allow the clock pulses of the clock generator to pass, and the information can be transmitted further to the OR gate 46 as the superposing unit.

The OR gate 46 has four inputs, each of which being connected to an output of one of the FIFO's 16, 22, 24,

29. If the information of one of the FIFO's 16, 22, 24 or 29 is applied to one of the inputs, this information passes to the output of the OR gate 46, i.e. information overlay occurs. The output of the OR gate 46 is connected to the activator unit 47 which controls the inkjet nozzles 5.

In order to simplify the illustration in FIG. 3, data lines for activating the counters 27, 31, 32 and 33, of the input unit 20, of the memories 14, 15, 16 and 26, of the FIFO's 16, 22, 24 and 29, as well as of a scale 49 by a microprocessor, not shown, have been omitted.

The inkjet nozzles 5 can eject several thousand droplets per second. Since this ejection rate is markedly below the processing rates of conventional electronic processing systems, several picture processing steps can be performed in series in order to save structural elements and cables.

In order to be able to change the logo as an advertisement quickly and simply, it can be advantageous to store the picture information for the logo in a further memory, not illustrated.

It is also possible to subdivide each of the illustrated FIFO's into four FIFO's in correspondence with the number of columns. Although this requires a higher electronic expenditure, it is thus possible to operate simultaneously with all four columns which results in a stronger color intensity since, per location on the piece of mail 3, a larger amount of ink can be sprayed.

In place of a single velocity pickup, it is also possible to utilize two of them, one measuring in this case the velocity component in the direction of the columns of the inkjet nozzles . . . 1, . . . 2, . . . 3, . . . 4, and the other measuring the component perpendicular thereto. The velocity pickup performing the measurement in the direction of the columns can be utilized for shifting the picture information in the rows of the inkjet nozzles, to thereby equalize again a distorted imprint due to a piece of mail 3 that does not travel linearly.

As illustrated in FIG. 3, the weight of the piece of mail 3 can be measured by the scale 49. The thus-determined weight is transmitted to the input unit 20 exhibiting a data processing unit (not shown) which calculates the postage rate for the imprint and transfers this rate to the memory 15 for the frankings.

An input of the picture information of the print is possible from a line-at-a-time scanned picture only by means of a computing step. Data processing takes place analogously to the procedure described above for producing a "1". The picture information of the data to be changed is stored preferably as individual characters in the respective memories 15, 16 or 26 in mirror-image mode and in nested form so that they can be composed in a simple way into a set of characters as a postage rate, a date, and identification.

In order to increase color intensity on the surface of the piece of mail, several ink drops can be applied to one location of the piece of mail 3. Several drops contain a greater amount of dye and thus contribute to improved opacity. Although the ejection takes place at a high repetitive frequency, the surface of the piece of mail moves on by a small extent which leads to slight "smudging" in the travel direction 7 perceived by the human eye as an improved and more intense color.

If the objective is not a high resolution of the picture, then, for obtaining a multicolored print, the inkjet nozzles of several columns can spray a different color ink. It is even possible to achieve a kind of four-color printing with the colors blue, yellow, red, as well as black. Resolution of the eye in case of a colored imprint is not as high as in case of a single-color print. For this reason, the colored imprint yields satisfactory results as well.

The inkjet nozzles and the conveying means can also be designed so that the piece of mail 3 is moved past the inkjet nozzles 5 in upright position instead of in prone position.

The clock generator 12 could also yield a constant clock frequency, if the velocity pickup 9 is omitted, in case only flat pieces of mail 3 or strips of labels are to be franked. However, the acceleration and the fact that customary pieces of mail 3, e.g. letters with partial filling, do not have a planar surface have the result that the relative velocity of the surface with respect to the inkjet nozzles 5 is not constant. This would lead, with constant clock frequency, to a nonuniform print. This is avoided by means of the timing synchronized by the velocity pickup 9.

In place of several rows of inkjet nozzles arranged inclined with respect to the travel direction, it is also possible to utilize a single row extending obliquely to the travel direction. Since the resolution attainable is dependent only on the entire number of inkjet nozzles, the same resolution can also be attained with a single row where the latter must then be correspondingly longer, if, during the spraying step, the velocity of the piece of mail and the clock frequency can be successfuly synchronized adequately while maintaining a linear movement of the piece of mail.

We claim:

1. A franking machine for franking a piece of mail (3) or a label to be applied to a piece of mail, comprising
- an inkjet printer,
- conveying means for relatively moving said piece of mail (3) or label and said inkjet printer past each other in a travel direction (7),
- said inkjet printer having a plurality of inkjet nozzles (5) spaced from the plane of said piece of mail (3) or label, said plurality of inkjet nozzles operative for ejecting ink drops only perpendicularly to the plane of and onto said piece of mail (3) or label,
- a control device (6) connected for controlling the chronological succession of ink drop ejection of said plurality of inkjet nozzles,
- said plurality of inkjet nozzles (5) being arranged offset by a mutual distance (a, b) transversely and longitudinally to said travel direction (7) in an array in such a way that the nozzles lie on a plurality of equidistant geometrical lines parallel to said travel direction (7), said plurality of geometrical lines being spaced from one another by an equidistance (d), which equidistance (d) is smaller than the mutual distance (a, b) of the nozzles, and so small that ink drops applied perpendicularly onto said piece of mail (3) or label, along a transverse line to said travel direction (7) adjoin one another without gaps or at least partially overlap one another, and
- said control device (6) connected to control the chronological sequence of the ink drop ejection in said perpendicular direction in such a way to apply to the piece of mail or label ink drop dots that adjoin one another at least approximately without gaps or at least partially overlap one another, in the travel direction (7) as well as transversely thereto.

2. A franking machine according to claim 1, in which said inkjet nozzles (5) are arranged in at least one row extending obliquely to the travel direction (7).

3. A franking machine according to claim 1, in which said inkjet nozzles (5) are arranged in several columns extending transversely to the travel direction (7), and the nozzles (5) of each column (5.1.1-5.32.1, . . . , 5.1.4-5.32.4) are mutually offset transversely to the travel direction with reference to the nozzles of the adjacent columns (5,1.1-5.32.1, . . . , 5.1.4-5.32.4).

4. A franking machine according to claim 1, in which said inkjet nozzles (5) are arranged in several mutually parallel rows (5.1.1-5.1.4, . . . , 5.32.1-5.32.4) and columns ((5.1.1-5.1.4, . . . , 5.32.1-5.32.4) wherein the columns (5.1.1-5.1.4, . . . , 5.32.1-5.32.4) lie at least approximately perpendicularly to the travel direction (7), and the rows (5.1.1-5.1.4, . . . , 5.32.1-5.32.4) form an acute angle (α) with the travel direction (7).

5. A franking machine according to claim 3, in which said inkjet nozzles (5) are spaced equidistant by said mutual transverse distance (a) in said inkjet nozzle rows (5.1.1-5.1.4, . . . , 5.32.1-5.32.4), and are spaced equidistant by said mutual longitudinal distance (b) in said inkjet nozzle columns (5.1.1-5.32.1, . . . , 5.1.4-5.32.4), wherein the inkjet nozzles (5) of adjacent columns (5.1.1-5.32.1, . . . , 5.1.4-5.32.4) are offset approximately by the distance (a) of two adjacent inkjet nozzles of one column (5.1.1-5.32.1, . . . , 5.1.4-5.32.4) divided by the number of columns, or by an integral divisor of the number of columns.

6. A franking machine according to claim 1, in which one portion of the plurality of inkjet nozzles (5) is associated with one color, and the other portion with at least one other color.

7. A franking machine according to claim 1, in which said control device (6) includes a velocity pickup (9) for measuring the speed of the piece of mail (3) or of the label with respect to the inkjet printer, and a clock generator (12) for controlling the chronological sequence of the ink drop ejection of said inkjet nozzles (5), and said clock generator (12) having a clock frequency that is controlled proportionally to the speed measured by said velocity pickup (9) so that the printed image on the piece of mail (3) or on the label is independent of the speed.

8. A franking machine according to claim 1, in which the inkjet nozzles (5) are fixedly arranged, and the piece of mail (3) or the label can be moved by means of said conveying means past the inkjet nozzles (5) in prone position or in upright position.

9. A franking machine according to claim 1, in which the chronological ink drop ejection sequence from said plurality of inkjet nozzles (5) is controlled by the control device (6) in such a way that several ink drops from one inkjet nozzle (5) can be applied to approximately the same location on the piece of mail (3) or on the label in order to attain an increased color intensity at this location.

10. A franking machine according to claim 1, in which said control device (6) includes at least one first memory (14) for storing fixed data for a print format repeated with each franking, a second memory (15, 16, 26) for storing respectively variable data, and an overlay device (46) connected with said first and second memories which overlays the data of the second memory (15, 16, 26) read out in chronological sequence over those of the first memory (14).

11. A franking machine according to claim 1, in which said plurality of inkjet nozzles (5) have axes which extend in parallel to one another so that the exit directions of the ink drops are in parallel to one another.

12. A franking machine for franking a piece of mail (3) or a label to be applied to a piece of mail, comprising an inkjet printer, conveying means for relatively moving said piece of mail (3) or label and said inkjet printer past each other in a travel direction (7), said inkjet printer having a plurality of inkjet nozzles (5) spaced from the plane of said piece of mail (3) or label, said plurality of inkjet nozzles operative for ejecting ink drops only perpendicularly to the plane of and onto said piece of mail (3) or label, a control device (6) connected for controlling the chronological succession of ink drop ejection of said plurality of inkjet nozzles, said plurality of inkjet nozzles being arranged in a plurality of parallel equidistant spaced (a) rows (5.1.1-5.1.4, . . . , 5.32.1-5.32.4) extending at an oblique angle (α) to said travel direction (7), and in a plurality of parallel equidistant spaced (b) columns (5.1.1-5.32.1, . . . , 5.1.4-5.32.4) extending transversely to said travel direction (7), the oblique angle (α) of said rows (5.1.1-5.1.4, . . . , 5.32.1-5.32.4) with respect to said travel direction (7) being dimensioned such, that the inkjet nozzles (5) of adjacent columns (5.1.1-5.32.1, . . . , 5.1.4-5.32.4) are offset perpendicularly to said travel direction (7) by an offset distance (d), which is the quotient of the row spaced distance (a) of two adjacent inkjet nozzles of one column divided by the total number of columns, or by an integral divisor of the total number of columns, the number of said columns being so great, the column offset distance (d) being so small, and said control device (6) being connected to control the chronological sequence of the ink drop ejection in said perpendicular direction in such a way as to apply to the piece of mail or label ink drop dots that adjoin one another at least approximately without gaps or at least partially overlap one another, in the travel direction (7) as well as transversely thereto.

* * * * *